United States Patent
Davis

(10) Patent No.: US 9,405,524 B1
(45) Date of Patent: Aug. 2, 2016

(54) SOFTWARE VERIFICATION SYSTEM AND METHODS

(71) Applicant: ALLSCRIPTS SOFTWARE, LLC, Chicago, IL (US)

(72) Inventor: George Frank Squires Davis, Dunwoody, GA (US)

(73) Assignee: ALLSCRIPTS SOFTWARE, LLC, Chicago, IL (US)

( * ) Notice: Subject to any disclaimer, the term of this patent is extended or adjusted under 35 U.S.C. 154(b) by 0 days.

(21) Appl. No.: 14/266,793

(22) Filed: Apr. 30, 2014

(51) Int. Cl.
*G06F 9/44* (2006.01)
*G06F 9/445* (2006.01)
*G06F 11/14* (2006.01)
*H04L 12/24* (2006.01)

(52) U.S. Cl.
CPC .. *G06F 8/61* (2013.01); *G06F 8/65* (2013.01); *G06F 8/60* (2013.01); *G06F 11/1433* (2013.01); *H04L 41/082* (2013.01); *Y10S 707/99954* (2013.01)

(58) Field of Classification Search
CPC .............. G06F 8/65; G06F 8/61; G06F 8/60; G06F 11/1433; G06F 11/3604; G06F 17/30377; H04L 41/082
See application file for complete search history.

(56) References Cited

U.S. PATENT DOCUMENTS

| | | | | |
|---|---|---|---|---|
| 6,735,768 B1* | 5/2004 | Tanaka | ................... | G06F 21/121 717/168 |
| 6,978,454 B2* | 12/2005 | Singleton | .................. | G06F 8/61 717/175 |
| 7,478,385 B2* | 1/2009 | Sierer | ........................ | G06F 8/61 717/168 |
| 2003/0046679 A1* | 3/2003 | Singleton | .................. | G06F 8/61 717/175 |
| 2003/0051235 A1* | 3/2003 | Simpson | ................... | G06F 8/60 717/174 |
| 2004/0015961 A1* | 1/2004 | Chefalas | ................... | G06F 8/60 717/178 |
| 2005/0229171 A1* | 10/2005 | Henry | .................... | G06F 21/572 717/168 |
| 2005/0273779 A1* | 12/2005 | Cheng | ........................ | G06F 8/62 717/168 |
| 2006/0031830 A1* | 2/2006 | Chu | ......................... | G06F 21/10 717/174 |
| 2006/0282834 A1* | 12/2006 | Cheng | ........................ | G06F 8/62 717/174 |
| 2008/0222732 A1* | 9/2008 | Caldwell | ............... | G06F 21/125 726/26 |
| 2012/0144386 A1* | 6/2012 | Wookey | .................... | G06F 8/68 717/174 |
| 2012/0297063 A1* | 11/2012 | Capomassi | ........ | G06Q 30/0601 709/224 |
| 2013/0067463 A1* | 3/2013 | Ito | ............................. | G06F 8/60 717/178 |
| 2013/0091498 A1* | 4/2013 | Arcese | ..................... | G06F 9/455 717/173 |
| 2013/0254127 A1* | 9/2013 | Lee | ....................... | G06Q 30/018 705/317 |
| 2014/0040873 A1* | 2/2014 | Goldman | .................. | G06F 8/65 717/168 |

OTHER PUBLICATIONS

LANDesk Management Suite 9.0, LANDesk Software Ltd., Creating Customer Definitions v1.0, 2007, retrieved online on Mar. 29, 2016, pp. 1-13. Retrieved from the Internet <URL: https://wikis.uit.tufts.edu/confluence/download/attachments/50806613/How%2520to%2520Create%2520Custom%2520Definitions%2520in%252090.pdf%3Fapi%3Dv2+&cd=10&hl=en&ct=clnk&gl=us>.*

Stefano Ceri et al., Automatic Generation of Production Rules for Integrity Maintenance, 1994, retrieved online on Mar. 29, 2016, pp. 1-59. Retrieved from the Internet: <URK: http://delivery.acm.org/10.1145/190000/185828/p367-ceri.pdf?>.*

* cited by examiner

*Primary Examiner* — Thuy Dao
*Assistant Examiner* — Hanh T Bui
(74) *Attorney, Agent, or Firm* — Tillman Wright, PLLC; Chad D. Tillman; Jeremy C. Doerre

(57) ABSTRACT

A method for detecting a confirmation of a properly installed software product on a computing device, determining the software product installation properties of the properly installed software product, and storing information relating to at least one or more software product installation properties of the properly installed software product.

12 Claims, 3 Drawing Sheets

SOFTWARE VERIFICATION SYSTEM AND METHODS

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention relates to computer systems. More specifically, the present invention relates to computer software installations in a computer system.

There are many web sites that instruct individuals on how to determine the version of their software product that is installed on a computer. Many times, though, the instructions require running a database script that returns a single piece of information stored in the database, or the script checks the file version of one EXE or DLL. There are also scripts and products that allow the user to see the list of installed applications and the respective version of each product on the computing device. None of these scripts or products, though, provides a thorough verification of the specific version of the software installed.

The current scripts and products available to verify software do not allow a user to build a thorough definition of a product.

Accordingly, there exists a need for an improved method and system for verifying installed software. This and other needs are addressed by one or more aspects of the present invention.

SUMMARY OF THE INVENTION

The present invention includes many aspects and features. Moreover, while many aspects and features relate to, and are described in, the context of healthcare applications, the present invention is not limited to use only in this context, as will become apparent from the following summaries and detailed descriptions of aspects, features, and one or more embodiments of the present invention.

Accordingly, one aspect of the present invention relates to a method for detecting a confirmation of a properly installed software product on a computing device, determining the software product installation properties of the properly installed software product, and storing information relating to at least one or more software product installation properties of the properly installed software product.

In a feature of this aspect, the product definition includes the stored information.

In another feature of this aspect, at least one or more installation properties include at least one or more of a file, a database object, a table, a procedure and registry entries.

In another feature of this aspect, the file information includes at least one or more of a name of the file, a directory where the file is located, a date and time last modified, a size, version number, and a flag.

In another feature of this aspect, the database object information includes metadata about the object.

In another feature of this aspect, the table information includes at least one or more of a list of columns in the table, data types and a maximum length.

In another feature of this aspect, the procedure information includes at least one or more of indexes, functions, triggers, constraints and foreign keys.

In another feature of this aspect, the registry entries information includes at least one or more of a name, location and flag.

Another aspect of the present invention relates to a method for verifying an installed software product stored on a computer device including the steps of determining the software product installation properties of the installed software product, comparing the installation properties to a stored product definition, and indicating to a user a confirmation that the installed software product is properly installed when the installation properties are equivalent to the product definition.

In a feature of this aspect, the stored product definition includes one or more installation properties of a previously confirmed properly installed software product.

In another feature of this aspect, the stored product definition is generated by a computer program comprising instructions for detecting a confirmation of the previously properly installed software product on a computing device, determining the software product installation properties of the previously properly installed software product, and storing information relating to at least one or more properly installed software product installation properties of the properly installed software product.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

Figure 1:
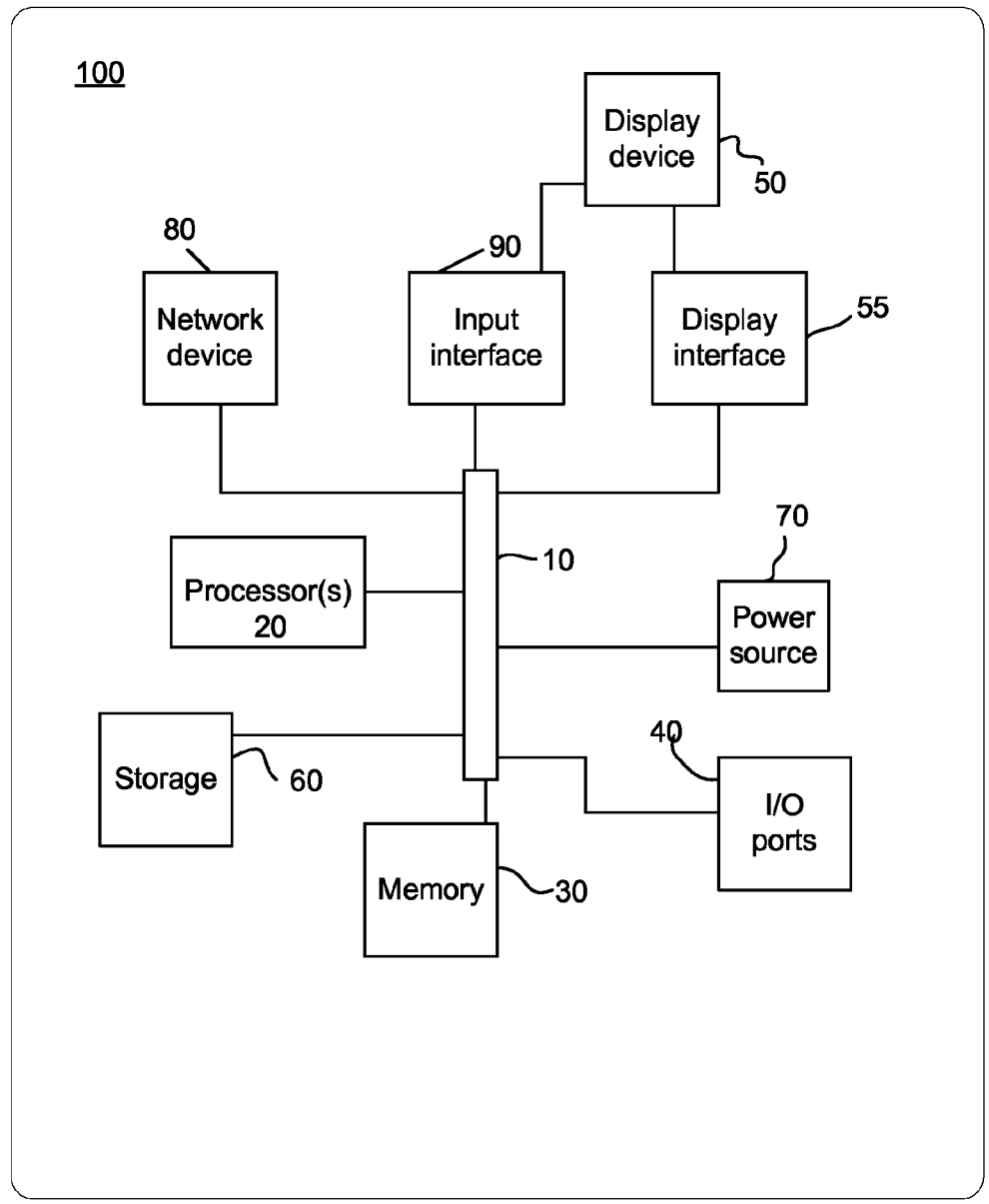
FIG. 1 is an example illustration of a computing device in accordance with a disclosed implementation of the present invention.

Referring now to the drawings, one or more preferred embodiments of the present invention are next described. The following description of one or more preferred embodiments is merely exemplary in nature and is in no way intended to limit the invention, its implementations, or uses.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

An example of a suitable computing device operable in accordance with an implementation of the disclosed system and method set forth below is illustrated in FIG. 1. It should be noted that the various functional blocks shown in FIG. 1 may include hardware elements, software elements (including computer code or instructions stored on a non-transitory machine-readable medium) or a combination of both hardware and software elements. The computing device 100, may be implemented in different forms. For example, the computing device 100 may be implemented as a server, group of servers, a desktop computer, laptop, workstation, personal digital assistant (PDA) and other appropriate computers. The computing device 100 includes a bus 10, display interface 55, display device 50, I/O ports 40, Input interface 90, data processing circuitry, such as one or more processors 20, a memory device 30, a non-volatile storage 60, a networking device 80 and a power source 70.

The computing device may be implemented as a mobile computing device. The mobile computing device may be implemented by various mobile devices, such as PDAs, cellular phones, smart phones, tablets and other similar computing devices. The mobile computing device includes a bus, a display, I/O ports, Input displays, one or more processors, a memory device, a non-volatile storage, a networking device, a power source, similar to the computing device 100 illustrated in FIG. 1. The mobile computing device further includes a transceiver for implementing wireless communication under various protocols, such as SMS or MMS messaging, CDMA, TDMA, WCDMA or GPRS, among others. The components of the computing devices as shown, their connections and relationships and their functions are meant for exemplary purposes only, and are not meant to limit implementations of the disclosed inventions described and/or claimed in this disclosure.

The display device 50 may be used to display images generated by the computing device 100, for example a graphical user interface (GUI). The display 50 may be any type of display such as a cathode ray tube (CRT), a liquid crystal display (LCD), a light emitting diode (LED) display, or other suitable display. In certain implementations of the computing device 100, the display 50 may include a touch-sensitive element, such as a touch screen.

The processor(s) 20 may provide data processing capability to execute and support one or more operating systems, computer programs, user and application interfaces, software systems and applications, and any other functions of the computing device 100 that may be stored in a memory on the processor 20, the memory device 30 or on the storage device 60. The processor(s) 20 may include one or more microprocessors, such as one or more "general-purpose" microprocessors, one or more special-purpose microprocessors and/or ASICS, for example.

The processor(s) 20 may communicate with a user through input interface 90 and display interface 55 coupled to the display 50. The display interface 55 may comprise appropriate circuitry for driving the display 50 to present graphical and other information to a user. The input interface 90 may receive commands from a user and convert them for submission to the processor 20.

The instructions or data to be processed by the processor(s) 20 may be stored in a memory 30. The memory 30 may be provided as a volatile memory, such as random access memory (RAM), and/or as a non-volatile memory, such as read-only memory (ROM). The memory 30 may store a variety of information and may be used for various purposes. For example, the memory 30 may store firmware executed by a processor 20 (such as a method for generating and storing a product definition and a method for verifying a proper software product installation on a computing device as discussed herein), other programs that enable various functions of the computing device 100, user interface functions, and processor functions. The memory 30 may also be another form of computer-readable medium.

The components may further include a non-volatile storage 60 for persistent storage of data and/or instructions. The non-volatile storage 60 may include flash memory, a hard drive, or any other optical, magnetic, and/or solid-state storage media. The non-volatile storage 60 may be used to store data files, software, wireless connection information (e.g., information that may enable the computing device 100 to establish a wireless connection, and any other suitable data. In addition, the non-volatile storage 60 may also store code and/or data for implementing various functions of the computing device 100, such as application or program code, data associated with such applications or programs, operating system code, user configured preferences, as well as code for implementing a method for generating and storing a product definition and a method for verifying a proper software product installation on a computing device as discussed herein. In implementation, the storage device 60 may be or contain a computer-readable medium.

A computer program product can be tangibly embodied in an information carrier. The computer program products may also contain instructions that, when executed, perform one or more methods, such as those described below. The information carrier is a computer- or machine-readable medium, such as the memory 30, the storage device 60, memory on processor 20, or a propagated signal.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The disclosed system and methods are preferably implemented by software, hardware, or a combination of hardware and software. The disclosed implementations can include implementation in one or more computer programs that are executable and/or interpretable on a programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in an appropriate programming language. As used herein, the terms "machine-readable medium" "computer-readable medium" refers to any computer program product, apparatus and/or device (e.g., magnetic discs, optical disks, memory) used to provide machine instruction and/or data to a programmable processor. The computer readable medium can also be distributed over network-coupled computer systems so that the computer readable code is stored and executed in a distributed fashion.

Implementations of the disclosed system and methods aim to remove the frustration and large amount of time spent troubleshooting a software issue that stems from an incomplete or improper installation of a product. The disclosed system and method provides the ability to thoroughly verify that all components of a given software product are installed on a given computing device. A complete and thorough definition of a properly installed software product is generated and stored on a computer readable medium, and used on other computing devices to verify that a software product installed on the other computing device is correct, confirming that no incorrect files, databases objects or registry entries exist that may cause the software product to operate improperly.

Referring to FIG. 1, when a software program is being installed on the computing device 100 from a computer readable medium, e.g., a disc or CD, the processor 20 executes the installation procedure stored on the medium. As those having skill in art know, the installation of a software program may include one or more of: the processor 20 making sure that necessary system requirements are met; checking the computing device 100 for existing versions of the software program, creating or updating program files and folders, adding configuration data such as configuration files, Windows registry entries or environment variables, making the software accessible to the user, for instance by creating links, shortcuts or bookmarks, configuring components that run automatically, such as daemons or Windows services, performing product activation, and updating the software versions.

Once the processor 20 has completed execution of the installation of the software program on the computing device 100, a user confirms that the software program was properly installed and is operating in the intended manner. The user decides whether or not to create the product definition form the installed software program immediately after installation or after the software program has been started and/or configured. Since some software programs create files, registry entries or database objects when first started, or when configured, the user decides what is considered a properly installed software program.

When a properly installed software program has been determined, the processor 20 executes a verification tool that interrogates the computing device and stores a detailed product definition of information relating to the software product's installation properties. The installation properties may include at least one or more of a file(s), database objects, tables and views, procedures and registry entries.

The verification tool is, preferably, stored on a computer readable medium. The verification tool may be a part of a memory in the processor, included in the computing device, a memory, storage, or an external medium that is coupled to the computing device via the I/O port. The product definition of the software program, as built by the verification tool, includes information about the files, registry entries and database objects associated with the product.

When building the product definition, the information relating to files that have version numbers (EXE, DLL, OCX, etc.) includes at least one or more of the name of the file, the directory where the file is located, the date and time last modified (e.g., using UTC format), the size, version number, an MD5 hash of the file contents and a flag to indicate if the file is optional or not. For files without version numbers, the information includes the name, directory and the flag to indicate if the file is optional or not.

In another implementation, the verification tool may allow the user to input more, or take away, information that is included in the product definition about the file, whether a versioned file or not.

For database objects, the information included in the product definition, built by the verification tool, includes metadata about each object. For tables and views, the product definition includes a list of columns in the table/view and for each column, a hash of the list of column names (in order of definition), data types, maximum length, if it can be NULL or not and if there is a default value.

For stored procedures, the product definition includes one or more of indexes, functions, triggers, constraints and foreign keys, a hash of the CREATE statement for that object as well as which database/table it's associated with, if applicable.

For registry entries, the product definition includes one or more of the name, location and a flag indicating if the entry is optional or not. Preferably, the product definition does not include the content of the entry, since registry items are for configuration purposes and therefore the content will vary from site to site and/or from computing device to computing device.

As a company creates newer versions of a product or if they receive a new version of a product from another vendor, the tool will need to be run again to generate a definition of the new version. It does not matter if this is an update to a given version, like a Service Pack, or a new, full version that might get released on a CD or DVD. This tool only works with cumulative updates to a product so if the update not cumulative, this tool will not be useful for defining that update. Full versions of a product are almost always cumulative so this tool will work in those situations.

The verification tool may be used internally by a company to create definitions of a software product's installation. It does not matter whether the company created the product or purchased it from another company. The creation of the product definition process will happen on machines where a known good installation of the product exists. This proper installation is meant to be a pristine environment where the software product is known to be installed correctly and completely.

Figure 2:
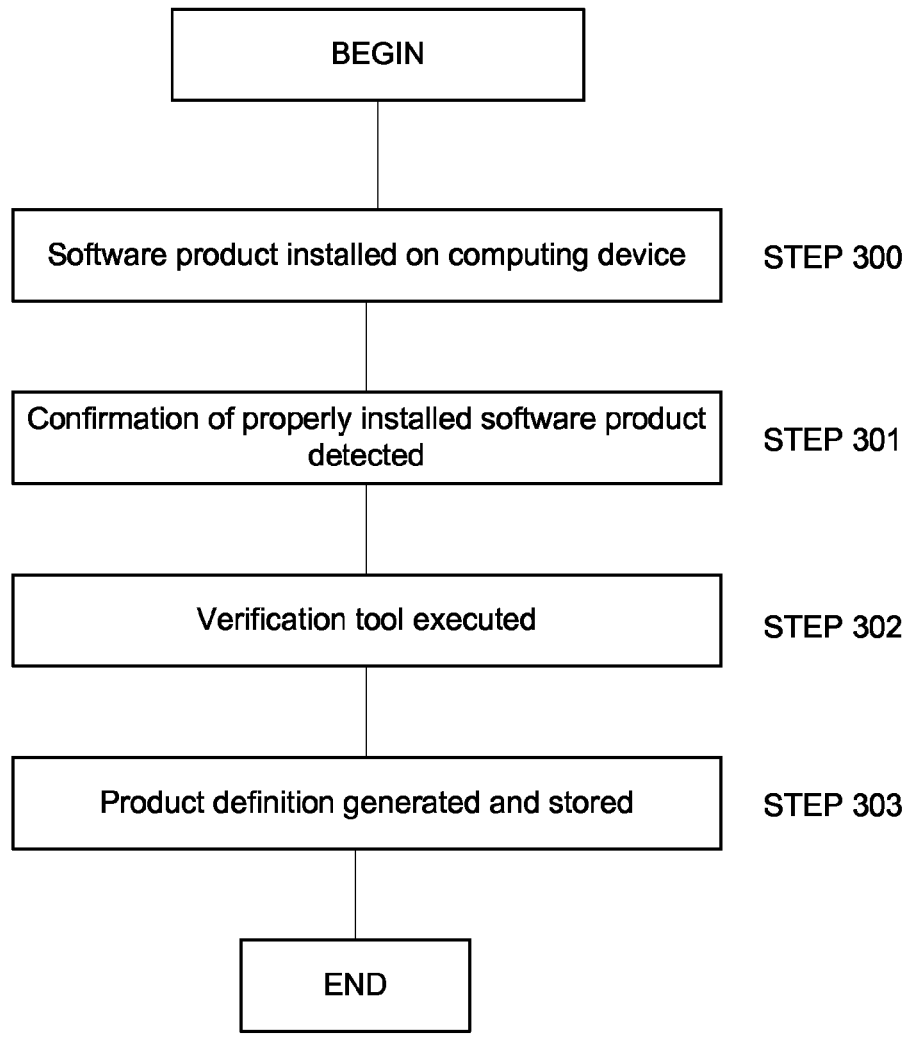
FIG. 2 is an example flow diagram of an implementation of the generation of a product definition in accordance with the present invention.

An example flow diagram of an implementation of the method for generating a product definition is illustrated in FIG. 2. A software product is installed on a computing device. STEP 300. A confirmation of a properly installed software product is detected by a processor included in the computing device from the user. STEP 301. The processor executes a verification tool to generate a product definition. STEP 302. The product definition is generated and saved by the processor to a computer readable medium. STEP 303.

The verification tool may also be used when a certain computing device needs to be interrogated to ensure that a given version of a product is installed correctly or not. This computing device, for example, can be at a customer site or on an internal machine used for internal needs, such as performance testing, or general Quality Assurance testing, e.g., before any users are allowed on the system to begin configuration or usage of the product.

Figure 3:
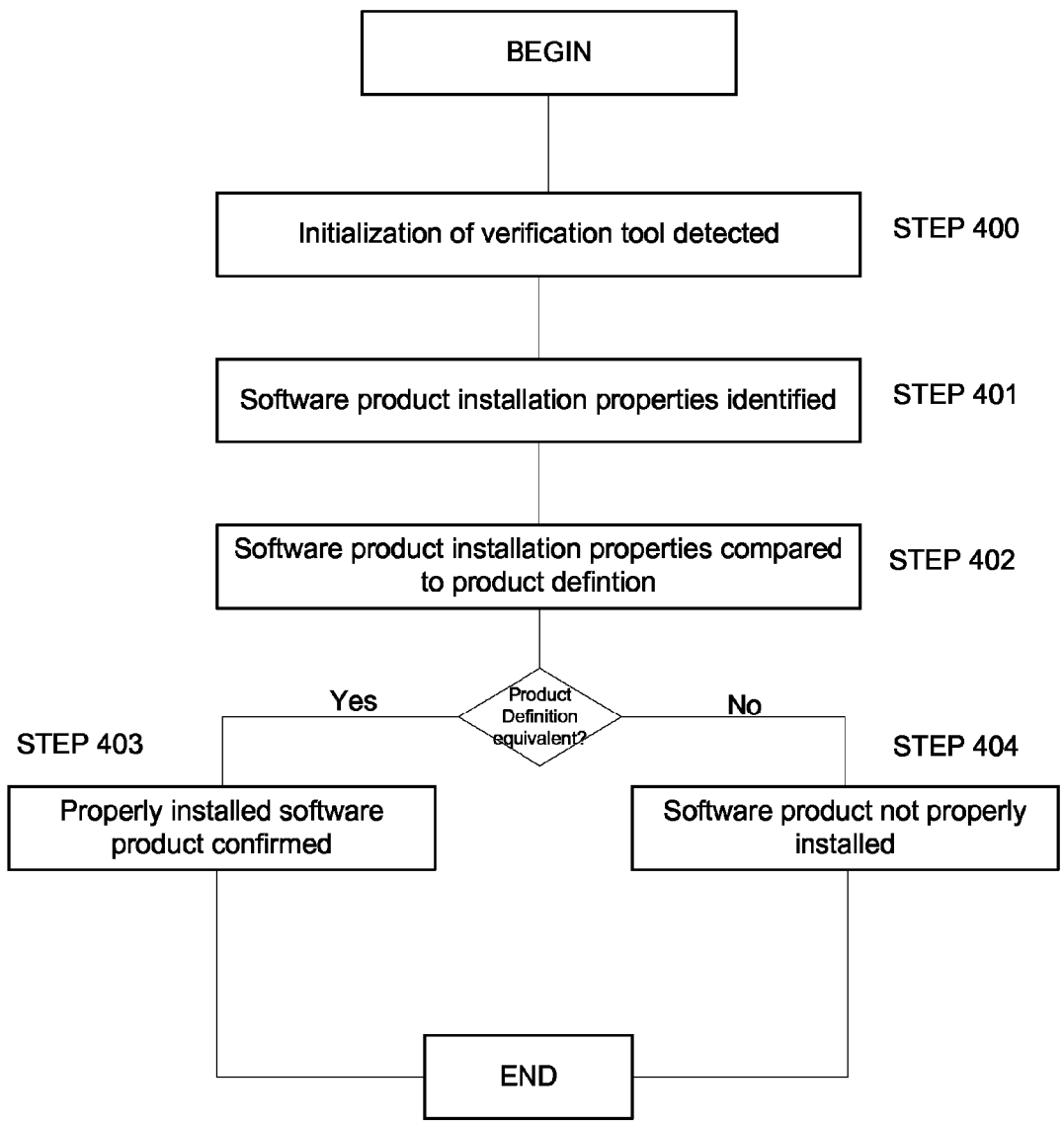
FIG. 3 is an example flow diagram of an implementation of the verification of an installed software product on a computing device in accordance with the present invention.

FIG. 3 is an example flow diagram of an implementation of the method for verifying that a computing device has a properly installed software product. A processor included in the computing device detects the initialization of the verification tool, including the product definition, stored on a computer readable medium. STEP 400. Product install information is detected for the software product by the processor. STEP 401. The verification tool compares the product install information to the product definition of the verification tool, STEP 402, and determines if the product install information is equivalent to the product definition. If the product definition is equivalent, the verification tool confirms a properly installed software product to the processor. STEP 403. Otherwise, the verification tool indicates to the processor that the software product installed on the computing device is not properly installed. STEP 404.

The disclosed system and method is useful to software companies that create one or more products and regularly release newer versions of the product. On in-house machines, product definitions of known good installations of a given product may be created. Accordingly, when customers have an issue with a product on site, the disclosed verification tool may be executed to verify that the installation is still correct before beginning normal troubleshooting procedures.

The disclosed implementation is also useful to companies that purchase products that are highly configurable. If the purchasing company has many different standard configurations, this tool can be used to compare a given machine against one of the standard configurations. Whether the purchasing company re-distributes the purchased product to its customers or uses it extensively in-house, the tool can be used to verify a test or production environment before the normal troubleshooting procedures are used to determine the root cause of a problem.

When using the tool to check an installation, installation using the classic Windows MSI Installer is not required. All that is needed is the files for the verification tool along with the product definitions to be placed on the customer box with a simple file copy.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A device comprising a non-transitory computer readable medium storing instructions for generating a product definition for a software product and validating installations of that software product using the generated product definition,
    (a) wherein the device is configured to be physically coupled to a computer via a hardware interface such that the computer can execute the stored instructions for generating a product definition for a software product and validating installations of that software product using the generated product definition;
    (b) wherein the device and instructions are configured to enable the device to be utilized in a method comprising
        (i) physically coupling the device to a first computer having a first installation of a first software product installed thereon,
        (ii) executing, using a processor of the first computer, instructions stored on the device which generate a first product definition for the first installation of the first software product installed on the first computer, such generation including
            (A) generating, for each file of the first installation on the first computer which includes a version number, a hash value for that respective file,
            (B) generating information about registry entries on the first computer for the first software product,
        (iii) physically coupling the device to a second computer having a second installation of the first software product installed thereon, and
        (iv) executing, using a processor of the second computer, instructions stored on the device which attempt to validate the second installation, such validation including
            (A) comparing the generated hash values for the first installation to generated hash values for the second installation, and
            (B) comparing the generated information about registry entries on the first computer for the first software product to registry entries on the second computer for the first software product.

2. The device of claim 1, wherein generating, for each file of the first installation on the first computer which includes a version number, a hash value for that respective file comprises generating an MD5 hash value.

3. The device of claim 1, wherein, with respect to executing, using a processor of the first computer, instructions stored on the device which generate a first product definition for the first installation of the first software product installed on the first computer, such generation comprises generating information about a database object.

4. The device of claim 1, wherein, with respect to executing, using a processor of the first computer, instructions stored on the device which generate a first product definition for the first installation of the first software product installed on the first computer, such generation comprises generating information about a table.

5. The device of claim 1, wherein, with respect to executing, using a processor of the first computer, instructions stored on the device which generate a first product definition for the first installation of the first software product installed on the first computer, such generation comprises utilizing information about a last modified time of a file.

6. The device of claim 1, wherein, with respect to executing, using a processor of the first computer, instructions stored on the device which generate a first product definition for the first installation of the first software product installed on the first computer, such generation comprises setting a flag to indicate whether a file is optional.

7. A method comprising
   (a) providing a device comprising a non-transitory computer readable medium storing instructions for generating a product definition for a software product and validating installations of that software product using the generated product definition, wherein the device is configured to be physically coupled to a computer via a hardware interface such that the computer can execute the stored instructions for generating a product definition for a software product and validating installations of that software product using the generated product definition;
   (b) physically coupling the device to a first computer having a first installation of a first software product installed thereon;
   (c) executing, using a processor of the first computer, instructions stored on the device which generate a first product definition for the first installation of the first software product installed on the first computer, such generation including
      (i) generating, for each file of the first installation on the first computer which includes a version number, a hash value for that respective file,
      (ii) generating information about registry entries on the first computer for the first software product;
   (d) physically coupling the device to a second computer having a second installation of the first software product installed thereon; and
   (e) executing, using a processor of the second computer, instructions stored on the device which attempt to validate the second installation, such validation including
      (i) comparing the generated hash values for the first installation to generated hash values for the second installation, and
      (ii) comparing the generated information about registry entries on the first computer for the first software product to registry entries on the second computer for the first software product.

8. The method of claim 7, wherein generating, for each file of the first installation on the first computer which includes a version number, a hash value for that respective file comprises generating an MD5 hash value.

9. The method of claim 7, wherein, with respect to executing, using a processor of the first computer, instructions stored on the device which generate a first product definition for the first installation of the first software product installed on the first computer, such generation comprises generating information about a database object.

10. The method of claim 7, wherein, with respect to executing, using a processor of the first computer, instructions stored on the device which generate a first product definition for the first installation of the first software product installed on the first computer, such generation comprises generating information about a table.

11. The method of claim 7, wherein, with respect to executing, using a processor of the first computer, instructions stored on the device which generate a first product definition for the first installation of the first software product installed on the first computer, such generation comprises utilizing information about a last modified time of a file.

12. The method of claim 7, wherein, with respect to executing, using a processor of the first computer, instructions stored on the device which generate a first product definition for the first installation of the first software product installed on the first computer, such generation comprises setting a flag to indicate whether a file is optional.

* * * * *